(12) United States Patent
Ashworth et al.

(10) Patent No.: US 12,020,831 B2
(45) Date of Patent: Jun. 25, 2024

(54) SUSPENDED SUPERCONDUCTING TRANSMISSION LINES

(71) Applicant: VEIR, Inc., Woburn, MA (US)

(72) Inventors: Stephen Paul Ashworth, Gallicano (IT); Franco Moriconi, Berkeley, CA (US); Timothy David Heidel, Alexandria, VA (US)

(73) Assignee: VEIR, Inc., Woburn, MA (US)

( * ) Notice: Subject to any disclaimer, the term of this patent is extended or adjusted under 35 U.S.C. 154(b) by 0 days.

(21) Appl. No.: 18/095,203

(22) Filed: Jan. 10, 2023

(65) Prior Publication Data
US 2023/0386705 A1    Nov. 30, 2023

Related U.S. Application Data

(63) Continuation of application No. 17/524,261, filed on Nov. 11, 2021, now Pat. No. 11,581,109.
(Continued)

(51) Int. Cl.
*H01B 12/00*    (2006.01)
*H01B 12/14*    (2006.01)
(Continued)

(52) U.S. Cl.
CPC .............. *H01B 12/16* (2013.01); *H01B 12/14* (2013.01); *H02G 7/20* (2013.01)

(58) Field of Classification Search
CPC ........... H01B 12/16; H01B 12/14; H02G 7/20
See application file for complete search history.

(56) References Cited

U.S. PATENT DOCUMENTS

| | | |
|---|---|---|
| 817,389 A | 4/1906 | Reynolds |
| 3,562,401 A | 2/1971 | Long |
| | (Continued) | |

FOREIGN PATENT DOCUMENTS

| | | | |
|---|---|---|---|
| EP | 1643197 B1 * | 11/2010 | ............ F25B 25/005 |
| EP | 3051542 A1 | 8/2016 | |
| | (Continued) | | |

OTHER PUBLICATIONS

Ashworth., et al. "A Novel Cooling Scheme for Superconducting Power Cables," Cryogenics, 2011, vol. 51, p. 161-167.
(Continued)

*Primary Examiner* — Pete T Lee
(74) *Attorney, Agent, or Firm* — COOLEY LLP

(57) ABSTRACT

Power transmission systems with cooling mechanisms, and methods of operating the same, are described. A power transmission system can include multiple support tower assemblies. Each of the support tower assemblies includes a support tower. One or more of the support tower assemblies includes a termination (i.e., a connection point via which electrical current and/or coolant can enter the transmission line and/or exit the transmission line). The power transmission system also includes multiple conductor assemblies suspended above a surface of the earth. Each conductor assembly includes an electrical conductor and is positioned between, and mechanically supported by, a pair of the support towers. The power transmission system also includes a coolant supply system that delivers a coolant fluid, during operation of the power transmission system, to at least one of the terminations, for cooling of the conductor assemblies.

21 Claims, 6 Drawing Sheets

Related U.S. Application Data

(60) Provisional application No. 63/115,140, filed on Nov. 18, 2020.

(51) Int. Cl.
*H01B 12/16* (2006.01)
*H02G 7/20* (2006.01)

(56) References Cited

U.S. PATENT DOCUMENTS

| | | | |
|---|---|---|---|
| 3,646,243 A | 2/1972 | Graneau et al. | |
| 3,694,914 A | 10/1972 | Aupoix et al. | |
| 3,723,634 A | 3/1973 | Aupoix et al. | |
| 3,781,455 A | 12/1973 | Hildebrandt | |
| 3,878,691 A | 4/1975 | Asztalos | |
| 3,917,897 A | 11/1975 | Hildebrandt | |
| 3,946,141 A * | 3/1976 | Schmidt | H01B 12/16 137/340 |
| 3,950,606 A | 4/1976 | Schmidt | |
| 4,082,967 A * | 4/1978 | Laskaris | H02K 55/04 310/10 |
| 4,091,298 A * | 5/1978 | Gamble | H02K 9/20 310/198 |
| 4,947,007 A * | 8/1990 | Dew | H02G 15/34 174/15.5 |
| 6,173,577 B1 | 1/2001 | Gold | |
| 7,296,419 B2 | 11/2007 | Suzawa et al. | |
| 7,358,435 B2 | 4/2008 | Ladie' et al. | |
| 7,453,041 B2 | 11/2008 | Maguire et al. | |
| 7,598,458 B2 | 10/2009 | Yumura et al. | |
| 7,614,243 B2 | 11/2009 | Masuda et al. | |
| 7,633,014 B2 | 12/2009 | Allais et al. | |
| 7,709,742 B2 | 5/2010 | Allais et al. | |
| 7,840,244 B2 | 11/2010 | Hirose et al. | |
| 7,840,245 B2 | 11/2010 | Hirose | |
| 7,953,466 B2 | 5/2011 | Jang et al. | |
| 7,979,976 B2 | 7/2011 | Soika et al. | |
| 7,997,093 B2 | 8/2011 | Kasahara | |
| 8,091,207 B2 | 1/2012 | Soika et al. | |
| 8,112,135 B2 | 2/2012 | Allals et al. | |
| 8,134,072 B2 | 3/2012 | Allais et al. | |
| 8,214,005 B2 | 7/2012 | Soika et al. | |
| 8,275,430 B2 | 9/2012 | Schmidt et al. | |
| 8,304,650 B2 | 11/2012 | Stemmle et al. | |
| 8,326,386 B2 | 12/2012 | Willen et al. | |
| 8,332,005 B2 | 12/2012 | Schmidt et al. | |
| 8,369,912 B2 | 2/2013 | Usoskin | |
| 8,380,267 B2 | 2/2013 | Soika et al. | |
| 8,401,601 B2 | 3/2013 | Soika et al. | |
| 8,433,381 B2 | 4/2013 | Choi et al. | |
| 8,478,374 B2 | 7/2013 | Maguire et al. | |
| 8,588,877 B2 | 11/2013 | Soika et al. | |
| 8,594,756 B2 | 11/2013 | Roden et al. | |
| 8,623,787 B2 | 1/2014 | Willen et al. | |
| 8,670,808 B2 | 3/2014 | Soika et al. | |
| 8,688,182 B2 | 4/2014 | Soika et al. | |
| 8,748,747 B2 | 6/2014 | Soika et al. | |
| 8,798,697 B2 | 8/2014 | Stemmle et al. | |
| 8,826,674 B2 | 9/2014 | Usoskin | |
| 8,897,845 B2 | 11/2014 | Stemmle et al. | |
| 8,923,940 B2 | 12/2014 | Stemmle et al. | |
| 8,934,951 B2 | 1/2015 | Schmidt et al. | |
| 8,948,831 B2 | 2/2015 | Stemmle et al. | |
| 8,954,126 B2 | 2/2015 | Stemmle et al. | |
| 9,002,423 B2 | 4/2015 | Jang et al. | |
| 9,006,576 B2 | 4/2015 | Stemmle et al. | |
| 9,037,202 B2 | 5/2015 | Yuan et al. | |
| 9,070,497 B2 | 6/2015 | Stemmle et al. | |
| 9,123,459 B2 | 9/2015 | Marzahn et al. | |
| 9,159,473 B2 | 10/2015 | Stemmle et al. | |
| 9,202,611 B2 | 12/2015 | Stemmle et al. | |
| 9,418,777 B2 | 8/2016 | Stemmle et al. | |
| 9,496,072 B2 | 11/2016 | Soika et al. | |
| 9,646,742 B2 | 5/2017 | Yuan et al. | |
| 9,653,196 B2 | 5/2017 | Yuan et al. | |
| 9,685,260 B2 | 6/2017 | Marzahn et al. | |
| 10,062,478 B2 | 8/2018 | Tamada et al. | |
| 10,062,479 B2 | 8/2018 | Stemmle et al. | |
| 10,151,521 B2 | 12/2018 | Schippl et al. | |
| 11,363,741 B2 | 6/2022 | Ashworth et al. | |
| 11,373,784 B2 | 6/2022 | Ashworth et al. | |
| 11,538,607 B2 | 12/2022 | Ashworth et al. | |
| 11,540,419 B2 | 12/2022 | Ashworth et al. | |
| 11,581,109 B2 | 2/2023 | Ashworth et al. | |
| 2005/0079980 A1 | 4/2005 | Hirose | |
| 2005/0173149 A1* | 8/2005 | Gouge | H02G 15/34 174/125.1 |
| 2006/0150639 A1 | 7/2006 | Zia et al. | |
| 2007/0053116 A1 | 3/2007 | Ichikawa et al. | |
| 2009/0166084 A1* | 7/2009 | Mirebeau | H01R 4/68 174/650 |
| 2009/0170706 A1 | 7/2009 | Hirose et al. | |
| 2009/0192042 A1 | 7/2009 | Kim et al. | |
| 2009/0221426 A1 | 9/2009 | Hazelton | |
| 2009/0254227 A1 | 10/2009 | Tsuda | |
| 2010/0099571 A1 | 4/2010 | Usoskin | |
| 2011/0180293 A1 | 7/2011 | Jang et al. | |
| 2013/0150246 A1 | 6/2013 | Willen et al. | |
| 2013/0165324 A1 | 6/2013 | Jang et al. | |
| 2013/0199821 A1 | 8/2013 | Teng et al. | |
| 2014/0221213 A1 | 8/2014 | Fukuda | |
| 2015/0080225 A1 | 3/2015 | Nomura et al. | |
| 2016/0141081 A1* | 5/2016 | Carter | H01B 12/16 174/15.5 |
| 2016/0190788 A1 | 6/2016 | Mitsuhashi et al. | |
| 2016/0322129 A1 | 11/2016 | Sunnegardh et al. | |
| 2016/0351304 A1 | 12/2016 | Schmidt et al. | |
| 2016/0370036 A1 | 12/2016 | Herzog et al. | |
| 2017/0330653 A1 | 11/2017 | Lee et al. | |
| 2017/0352454 A1 | 12/2017 | Na et al. | |
| 2018/0166188 A1 | 6/2018 | Arndt et al. | |
| 2018/0182513 A1 | 6/2018 | Na et al. | |
| 2019/0260194 A1 | 8/2019 | Stemmle et al. | |
| 2021/0005355 A1 | 1/2021 | Yamaguchi et al. | |
| 2021/0080153 A1 | 3/2021 | Hildenbeutel | |
| 2022/0028583 A1 | 1/2022 | Alekseev | |
| 2022/0146563 A1 | 5/2022 | Dong et al. | |
| 2022/0157495 A1 | 5/2022 | Ashworth et al. | |
| 2022/0159873 A1 | 5/2022 | Ashworth et al. | |
| 2022/0254550 A1 | 8/2022 | Ashworth et al. | |
| 2022/0272867 A1 | 8/2022 | Ashworth et al. | |
| 2022/0277873 A1 | 9/2022 | Ashworth et al. | |
| 2023/0223170 A1 | 7/2023 | Ashworth et al. | |
| 2023/0269907 A1 | 8/2023 | Ashworth et al. | |

FOREIGN PATENT DOCUMENTS

| | | |
|---|---|---|
| GB | 1499384 A | 2/1978 |
| WO | WO-2008018896 A2 | 2/2008 |
| WO | WO-2008097759 A1 | 8/2008 |
| WO | WO-2008100702 A2 | 8/2008 |
| WO | WO-2009120833 A1 | 10/2009 |
| WO | WO-2010039513 A1 | 4/2010 |
| WO | WO-2014007903 A2 | 1/2014 |
| WO | WO-2022106131 A1 | 5/2022 |
| WO | WO-2022108818 A1 | 5/2022 |
| WO | WO-2022108819 A1 | 5/2022 |
| WO | WO-2022108820 A1 | 5/2022 |

OTHER PUBLICATIONS

Firsov, V.P., et al., "Evaporating System for Cryogenic Support of Long Length HTS Power Cables," International Journal of Hydrogen Energy, Jul. 2018, vol. 43(29), pp. 13594-13604, XP055887770.

Honjo et al. "Status of Superconducting Cable Demonstration Project in Japan", IEEE Transactions on Applied Superconductivity, vol. 21, No. 3, 2011, pp. 967-971.

International Preliminary Report on Patentability issued for International Application No. PCT/US2021/058926, dated Jun. 1, 2023, 8 pages.

International Preliminary Report on Patentability issued for Inter-

(56) References Cited

OTHER PUBLICATIONS national Application No. PCT/US2021/058927, dated Jun. 1, 2023, 7 pages.
International Preliminary Report on Patentability issued for International Application No. PCT/US2021/058928, dated Jun. 1, 2023, 13 pages.
International Search Report and Written Opinion for Application No. PCT/US2021/058927, dated Feb. 28, 2022, 13 pages.
International Search Report and Written Opinion for Application No. PCT/US2021/058928, dated Apr. 20, 2022, 22 pages.
International Search Report and Written Opinion for International Application No. PCT/US2021/058926 dated Feb. 18, 2022, 16 pages.
Invitation to Pay for International Application No. PCT/US2021/058928 dated Feb. 25, 2022, 15 pages.
Los Alamos Science and Technology Magazine 1663, Jul. 2009, 15 pages.
Machine Translation of WO2022/106131A1 (9 pages).
Notice of Allowance for U.S. Appl. No. 17/524,261, dated Oct. 18, 2022, 8 pages.
Notice of Allowance for U.S. Appl. No. 17/524,262, dated Apr. 8, 2022, 6 pages.
Notice of Allowance for U.S. Appl. No. 17/524,267, dated Apr. 19, 2022, 8 pages.
Notice of Allowance for U.S. Appl. No. 17/742,708, dated Aug. 22, 2022, 7 pages.
Notice of Allowance for U.S. Appl. No. 17/750,741, dated Aug. 24, 2022, 8 Pages.
Notice of Allowance for U.S. Appl. No. 17/992,610 dated Oct. 12, 2023, 9 pages.
Corrected Notice of Allowance for U.S. Appl. No. 17/992,610 dated Oct. 25, 2023, 4 pages.

\* cited by examiner

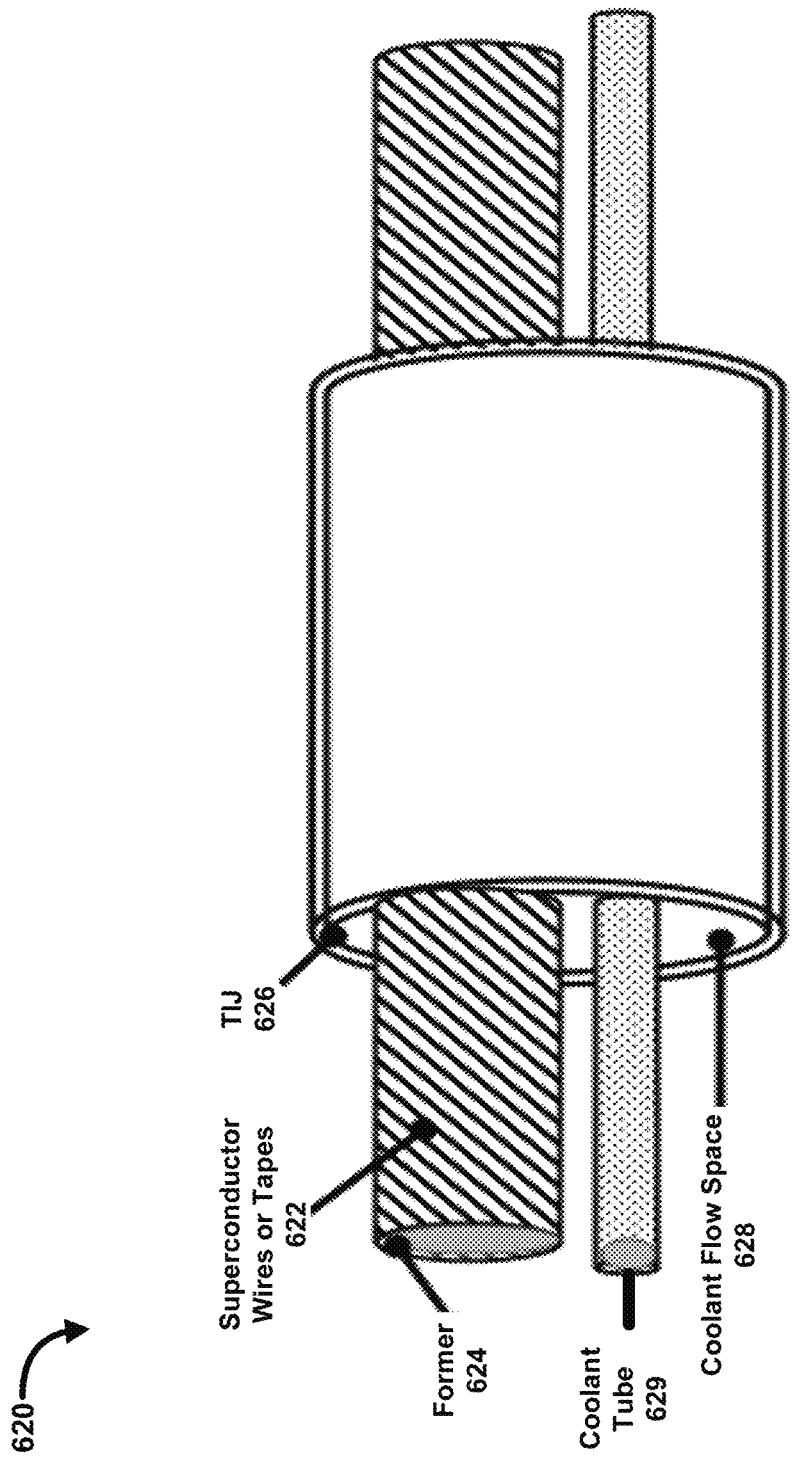

SUSPENDED SUPERCONDUCTING TRANSMISSION LINES

RELATED APPLICATIONS

This application is a Continuation of U.S. patent application Ser. No. 17/524,261, filed Nov. 11, 2021 and titled "Suspended Superconducting Transmission Lines," which claims priority to and the benefit of U.S. Provisional Patent Application No. 63/115,140, filed Nov. 18, 2020 and titled "Suspended Superconducting Transmission Lines," the disclosures of which are hereby incorporated by reference herein in their entireties.

FIELD

The present disclosure is related to the field of electricity transmission, and more specifically, to the distribution of alternating current (AC) or direct current (DC) electrical power using overhead, suspended transmission lines.

BACKGROUND

Electric power is typically moved from its point of generation to consumer loads using an electric power grid ("the grid"). Electric power grids include components such as power generators, transformers, switchgear, transmission and distribution lines, and control and protection devices.

SUMMARY

Embodiments described herein relate to power transmission systems with cooling mechanisms, and methods of operating the same. In some embodiments, a power transmission system includes multiple support tower assemblies. Each of the support tower assemblies includes a support tower. One or more of the support tower assemblies includes a termination (i.e., a connection point via which electrical current and/or coolant can enter the transmission line and/or exit the transmission line). The power transmission system further includes multiple conductor assemblies suspended above a surface of the earth. Each conductor assembly includes an electrical conductor and is disposed between, and mechanically supported by, a pair of the support towers from the plurality of support towers. Each conductor assembly includes a superconducting current carrying element, and is configured to receive a coolant flow to maintain the superconductor material within a temperature range below an ambient temperature. In some embodiments, each conductor assembly can optionally include a thermally insulating jacket (also referred to herein as a thermal insulation jacket) ("TIJ") to contain the coolant flow. In some embodiments, the thermal insulation jacket is not electrically isolated from an operating voltage of the power transmission system. The power transmission system further includes a coolant supply system that delivers a coolant fluid, during operation of the power transmission system, to at least one termination from the plurality of terminations for cooling of the conductor assemblies.

BRIEF DESCRIPTION OF THE DRAWINGS

FIG. 6 shows a perspective view of a section of a conductor assembly for use in a superconducting OH power transmission line/system, including a coolant tube, according to an embodiment.

DETAILED DESCRIPTION

Figure 1:
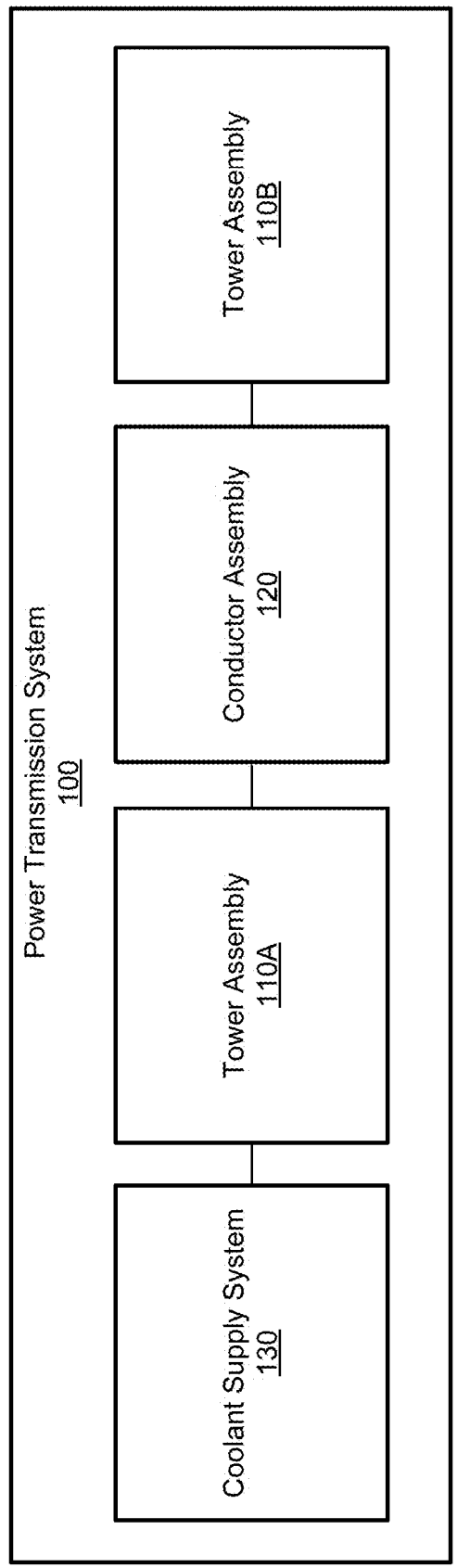
FIG. 1 is a block diagram showing components of an example superconducting overhead power transmission system, according to an embodiment.

Embodiments described herein relate to power transmission systems with superconductor cables and cooling mechanisms, and methods of producing and operating the same. Superconductor cables employed in power transmission systems, as set forth herein, can operate at up to 10 times the current of conventional wire while maintaining superconductivity. Higher current allows for lower voltage and smaller rights-of-way. Additionally, energy can be transferred through power transmission systems at a higher rate through narrow rights-of-way with reduced energy losses, as contrasted with known systems. Moreover, by incorporating active cooling mechanisms into power transmission systems with superconductors, power transmission lines of the present disclosure can exhibit reduced sag and creep and/or more consistent sag and creep over time, as contrasted with known systems. In other words, power transmission lines of the present disclosure may exhibit sag and/or creep that are not variable, or that do not substantially vary, over time, in view of the actively controlled temperature of the power transmission lines.

Known electric power transmission systems use continuous electrical conductors to interconnect power generation stations with consumer loads. Power generation stations, such as thermal (e.g., steam-driven), nuclear, hydroelectric, natural gas, solar and wind power plants, generate electric energy at AC voltages typically ranging between 15 kV and 25 kV. To transport the energy over long distances, the associated voltage is increased at the power generation station, for example via a step-up transformer. Extra-high-voltage (EHV) power transmission lines can transport the energy to geographically remote substations at voltages of 230 kV and above. At intermediate substations, the voltage can be reduced to high-voltage (HV) levels via a step-down transformer, and the energy is transported to HV substations via power transmission lines that operate at voltages ranging from 220 to 110 kV. At HV substations closer to the loads, the voltage is further reduced to 69 kV, and sub-transmission lines connect the HV substations to the many distribution stations. At the distribution substations, the voltage is reduced to a value in the range of 35 kV to 12 kV before being distributed to the loads at 4160/480/240/120V via pole-top or pad-mounted step-down transformers. The precise voltages used in transmission and distribution vary slightly in different regions and different countries.

In the United States, an EHV power transmission line has a nominal voltage of between 230 kV and 800 kV, and a HV power transmission line has a nominal voltage of between 115 kV and 230 kV. For voltages of between 69 kV and 115 kV, the line is considered to be at a sub-transmission level, and below 60 kV it is considered to be at a distribution level. The voltage values demarcating these designations are somewhat arbitrary, and can vary depending on the authority having jurisdiction and/or the location. Known EHV power transmission lines can transport energy as far as 400-500 miles, whereas HV power transmission lines can transport energy as far as 200 miles, and sub-transmission lines can transport energy for 50-60 miles. High-voltage DC (HVDC) power transmission lines are used to transmit energy over long distances or underwater. In a HVDC system, AC voltage generated by a generator is rectified, and the energy is transmitted via a DC cable to the receiving station, where an inverter is used to convert DC voltage back to AC.

As described above, electrical conductors are used to form a continuous connection between the generators and the consumer loads (the "load"). The electrical conductors can include bus bars, underground cables, and/or overhead (i.e., physically suspended) lines (both transmission and distribution), as appropriate. Overhead ("OH") power transmission lines are primarily used in open corridors or along wide roads, whereas underground cables may be used in congested areas of densely populated cities. OH transmission systems include a system of supporting structures such as towers or poles (also referred to as "pylons") that support the electrical conductor above the ground. OH power transmission systems also include dielectric insulators that mechanically connect the conductor to the tower while keeping them electrically isolated from one another and from the tower, and elements to provide electrical ground and mechanical integrity. Elements that provide electrical ground and mechanical integrity can include structural foundations, grounding electrodes, and shield conductors. Each supporting structure can be of one of the following types: (A) pass-through/continuity (i.e., providing continuity of coolant flow and continuity of power transmission, without an auxiliary coolant inlet or outlet, and without performing re-cooling, re-pressurization, or flow control of the coolant); (B) flow supplementing (i.e., providing continuity of coolant flow and continuity of power transmission, and including an auxiliary coolant inlet and/or outlet, but without performing re-cooling, re-pressurization, or flow control of the coolant); (C) coolant processing (i.e., providing continuity of coolant flow and continuity of power transmission, and performing re-cooling, re-pressurization, or flow control of the coolant, but without an auxiliary coolant inlet or outlet); or (D) combination (i.e., providing continuity of coolant flow and continuity of power transmission, with an auxiliary coolant inlet and/or outlet, and performing re-cooling, re-pressurization, and/or flow control of the coolant). OH transmission systems set forth herein can include any combination of supporting structures A, B, C, and D or of subsets thereof. The supporting structures can have any of a variety of designs depending on, among other considerations, the voltage of the power transmission line, the location, and/or the requirements of local governments or other regulatory authorities. Example designs include: lattice or tubular towers, cantilevered or guyed poles and masts, and framed structures. Materials used to fabricate such supporting structures can include, for example: galvanized steel, concrete, wood, plastic and/or fiberglass composite(s).

Conductors for OH power transmission lines can be bare metal (e.g., copper, aluminum, or a matrix of aluminum and steel), or they can be coated or wrapped with an electrical dielectric insulation. Bare metal conductors are less expensive than insulated conductors, and thus are generally preferred in OH power transmission lines. Although aluminum has a lower electrical conductivity than copper, it is more commonly used in OH power transmission lines, due to its lower cost and lighter weight. To increase the mechanical strength of aluminum conductors, steel strands can be introduced into the conductor core, thereby forming a composite conductor. The aluminum conductor steel-reinforced (ACSR) conductor is currently the most common conductor used in OH power transmission lines. Recently, "high temperature, low sag" conductors comprising a matrix of aluminum and composite materials and/or other metals have also been deployed in grids. Dielectrically insulated OH conductors are much more common in the distribution regions of the grid and at lower voltages (e.g., below 25 kV). Underground conductors are typically covered with electrical insulation to prevent electrical contact with other conductors or the ground/soil.

Bare OH conductors, when used in OH power transmission systems, are typically suspended from poles or towers, supported by insulators, and designed to maintain a prescribed minimum clearance with respect to the ground/soil, vegetation, and other structures. Surrounding air is typically the electrical insulation medium employed in bare OH conductor systems. In other words, no additional structures are fixed to bare OH conductor systems. The insulators can be attached to the poles or towers in a variety of different configurations, depending on the type and location of the pole/tower. Insulators can be fabricated from a variety of different materials, such as ceramic, porcelain, glass, and composite(s). Insulators are designed and selected to withstand electrical, mechanical, and environmental stresses. Over the life of the power transmission line, electrical stresses can be generated within the insulators due to continuous operations and the associated temporary overvoltages produced by switching, faults, and lightning. Mechanical stresses can also be generated within the insulators, as a result of the conductor dead weight, ice formation, and wind loading. Environmental stresses can impact both the electrical performance and the mechanical performance of insulators, and can be caused by ambient temperature fluctuations, UV radiation, rain, icing, pollution, and altitude.

When suspended by support structures, a conductor typically exhibits a curved shape, with a minimum clearance to ground occurring at some point between the two closest suspension poles or towers. The minimum clearance to ground, or to other energized parts, is typically determined by the engineering standards adopted for the location (e.g., state or federal), and depends on the voltage of the transmission line. Higher voltage lines typically have a greater specified minimum clearance to ground, and consequently use higher suspension poles or towers.

Known OH conductors have a non-zero electrical resistivity. When a conductor is carrying power, the electrical current generates heat and the conductor temperature rises above the ambient temperature. The electrical resistance of the conductor increases linearly with increasing temperature, and thus the associated resistive losses ($I^2R$) and can be significant at high power levels. Such losses can also limit the power that a conductor can carry, as conductors have maximum operating temperatures determined by the properties of their component materials. Operating at excessively high temperatures can cause the material properties of the conductor to degrade over time.

Due to thermal expansion, elevated conductor temperatures can cause the length of the conductor to increase, thereby reducing the clearance to ground (i.e., increasing 'sag'). Conductors can also elongate, or "creep," over time due to tension, resulting in a permanently increased sag. This increased sag may be taken into account when determining the minimum clearance to ground during installation of the conductor. The maximum current or power that causes the conductor to reach the maximum allowable sag is known as a "thermal limit."

Many OH conductors have a manufacturer-imposed upper operating temperature limit of 75° C. The maximum rated current for a given operating temperature limit, under prescribed conditions of ambient temperature and wind, is known as the ampacity. OH conductors are typically available with rated ampacities to 2,000 amperes (2,000 A) at 75° C. Some 'high temperature' conductors can be safely operated up to a temperature of 225° C. without permanent damage or excessive sag. The energy losses of maintaining a transmission line at 225° C. over hundreds of miles in length are, however, large.

The "physical thermal limit" of an OH transmission line refers to the amount of power the OH transmission line can transport before reaching its maximum operating temperature. The physical thermal limit can depend on ambient conditions such as atmospheric temperature, sun, wind, time of day (angle of the sun), etc. It is difficult for an operator of the OH transmission line to know the conditions at all locations of the OH transmission line in real time, so the thermal limit is often set conservatively, leading in some cases to transmission lines being significantly underutilized as compared to a scenario in which "dynamic" limits could be used.

In view of the foregoing, it is desirable to increase ampacities to increase the power carried at a specified voltage. It is further desirable to reduce the overall energy losses in transmitting electrical power, to avoid the use of more expensive higher operating temperature materials. It is further desirable to remove the effects of environment on the capacity limits of the transmission line, to allow maximum utilization. The acquisition and permitting of rights of way for power transmission lines is one of the major impediments to installing new power lines or increasing the capacity of existing lines. As such, when designing new transmission lines, ensuring compatibility with an existing system voltage specification (e.g., of an existing transmission line) facilitates the re-use of existing rights of way, thereby reducing costs. The width of the right of way depends on the tower height and, hence, operating voltage. Operating at lower voltages for a given power facilitates the use of shorter towers or poles, thereby reducing environmental impacts and potentially increasing public acceptance.

In some applications, it is desirable to electrically insulate a conductor to reduce its potential to initiate fires. Enclosing a conductor in electrical insulation can also thermally insulate the conductor, however, thereby increasing its temperature for a given power dissipation. This reduces the ampacity of a thermally limited conductor and hence the power for a given voltage.

Some electrically insulated conductors include a second conductor layer at ground potential (or negative system voltage) outside the insulator. If this outer 'shield' conductor has the same ampacity as the inner ("core") conductor and the circuit is arranged so that it always carries the same current as the core but with the opposite polarity, then the external magnetic and electrical fields are always zero. A current carrying shield can also act to reduce the self-inductance of the conductor with potential system benefits. A shield with nonzero electrical resistance, however, will generate heat when carrying current, thus reducing the thermal limit of the system.

In view of the foregoing, there is a need for transmission line systems that can carry AC power and/or DC power at currents higher than those of known systems discussed above and/or at voltage levels lower than those of known systems, that can be suspended from poles or towers, whose power capacity is substantially independent of the environmental conditions, whose power/energy losses to heat are lower, that have reduced visual impact, and that utilize narrower rights of way for a given power rating. The conductors of such transmission line systems may be electrically insulated and, optionally, include a shield layer that does not significantly reduce ampacity. Such transmission line systems are the subject of the present disclosure.

According to some embodiments, a system for transporting AC electrical power or DC electrical power includes suspended, OH power transmission lines constructed using one or more superconducting materials, and exhibiting reduced energy losses which may be time-shifted. The system also includes thermal insulation and a coolant that flows during operation, to maintain the superconducting materials at a specified operating temperature. Mechanical components of the system are selected based on their mechanical properties being sufficient to physical suspension of the OH power transmission lines.

In some embodiments, a power system for transporting AC electrical power or DC electrical power via a suspended, overhead power transmission line includes a conducting element having a plurality of wires (also referred to as "tapes"). The plurality of wires include at least one superconductor. The power system also includes a thermal insulation jacket ("TIJ") to minimize an amount of heat that reaches the conductor from the surroundings of the conductor. The TIJ can be maintained at a system voltage level, or can be electrically grounded. The power system also includes a mechanical tensile support element, disposed within the TIJ, to support the conductor and to suspend the conductor off the ground, for example in the manner of an overhead power transmission line. The power system also includes a coolant supply system configured to cool the superconductor to a predefined operating temperature during operation of the power system, and to maintain the operating temperature within a predefined temperature range by removing heat generated within the power system during operation of the power system and/or heat entering the power system during operation of the power system. The power system also includes a coolant delivery and conditioning system configured to deliver coolant fluid (e.g., liquid, gas, or a combination of liquid and gas) to one or more locations (e.g., a start end, a terminal end, and/or intermediate point(s)) of the transmission line by causing the coolant fluid to flow into and along the transmission line. The power system also includes a plurality of terminations via which electrical current and/or coolant can enter the transmission line and/or exit the transmission line. In one or more embodiments, the power system can also include one or multiple intermediate conditioners (also referred to herein as "re-cooling stations" or "intermediate cooling stations") where the coolant is maintained at operating temperature(s) and pressure(s). The intermediate conditioners can be maintained at the system voltage level and isolated from ground potential, or the intermediate conditioners can be maintained at ground potential. In other embodiments, no intermediate conditioners are included in the power system. The power system also includes a venting system that is collocated with the re-cooling stations and/or at least a subset of the plurality of terminations, and is configured to vent excess vapor(s), produced by the coolant, to atmosphere. The power system also includes one or more towers and/or poles configured to support the transmission line, and a plurality of dielectric insulators configured to mechanically support the transmission line on the tower(s)/pole(s), and to electrically isolate the transmission line from the tower(s)/pole(s).

Although functional elements are listed separately herein, it may be advantageous to combine two or more functions into one element. For example, the mechanical tensile support could be formed from a portion of the TIJ. Implementation of embodiments described herein can aid in high-current power transmission over long distances with relatively low losses.

FIG. 1 is a block diagram showing components of a power transmission system 100, according to an embodiment. The power transmission system 100 includes tower assemblies 110A, 110B (collectively referred to as tower assemblies 110), electrically coupled via a conductor assembly 120. A coolant supply system 130 is fluidically coupled to the tower assemblies 110 and the conductor assembly 120. In some embodiments, the power transmission system can include a superconducting OH power transmission system.

In some embodiments, power can be input to the power transmission system 100 from an external power grid or other external power source. The power is routed via one or more electrical connections to the tower assembly 110A. The power is then routed to the tower assembly 110B via the conductor assembly 120. From the tower assembly 110B, the power can be routed to additional tower assemblies 110 or to one or more consumer loads. As shown, the power transmission system 100 includes two tower assemblies 110. In some embodiments, the power transmission system 100 can include any number of tower assemblies 110, depending upon the application and/or the distance over which the power is to be transmitted. In some embodiments, the power transmission system 100 can include at least about 2, at least about 3, at least about 4, at least about 5, at least about 6, at least about 7, at least about 8, at least about 9, at least about 10, at least about 20, at least about 30, at least about 40, at least about 50, at least about 60, at least about 70, at least about 80, at least about 90, at least about 100, at least about 150, at least about 200, at least about 250, at least about 300, at least about 400, or at least about 450, or at least about 500, or at least about 550, or at least about 600, or at least about 650, or at least about 700, or at least about 750, or at least about 800, or at least about 850, or at least about 900, or at least about 950, or at least about 1,000, or at least about 2,000, or at least about 3,000, or at least about 4,000, or at least about 5,000, or between bout 5,000 and about 10,000 tower assemblies 110. In some embodiments, the power transmission system 100 can include no more than about 10,000, no more than about 7,500, no more than about 5,000, no more than about 2,500, no more than about 1,500, no more than about 1,000, no more than about 500, no more than about 450, no more than about 400, no more than about 350, no more than about 300, no more than about 250, no more than about 200, no more than about 150, no more than about 100, no more than about 90, no more than about no more than about 70, no more than about 60, no more than about 50, no more than about 40, no more than about 30, no more than about 20, no more than about 10, no more than about 9, no more than about 8, no more than about 7, no more than about 6, no more than about 5, no more than about 4, or no more than about 3 tower assemblies 110. Combinations of the above-referenced number of tower assemblies 110 are also possible (e.g., at least about 2 and no more than about 500 or at least about 10 and no more than about 50), inclusive of all values and ranges therebetween. In some embodiments, the power transmission system 100 can include about 2, about 3, about 4, about 5, about 6, about 7, about 8, about 9, about 10, about 20, about 30, about about 50, about 60, about 70, about 80, about 90, about 100, about 150, about 200, about 250, about 300, about 350, about 400, about 450, or about 500 tower assemblies 110.

As shown, the power transmission system 100 includes one conductor assembly 120 providing an electrical coupling between the tower assemblies 110. In some embodiments, the power transmission system 100 can include any number of conductor assemblies 120, depending upon the application and/or the distance over which the power is to be transmitted. In some embodiments, the power transmission system 100 can include at least about 1, at least about 2, at least about 3, at least about 4, at least about 5, at least about 6, at least about 7, at least about 8, at least about 9, at least about 10, at least about 20, at least about 30, at least about 40, at least about 50 at least about 60, at least about 70, at least about 80, at least about 90, at least about 100, at least about 150, at least about 200, at least about 250, at least about 300, at least about 400, or at least about 450, or at least about 500, or at least about 550, or at least about 600, or at least about 650, or at least about 700, or at least about 750, or at least about 800, or at least about 850, or at least about 900, or at least about 950, or at least about 1,000, or at least about 2,000, or at least about 3,000, or at least about 4,000, or at least about 5,000, or between about 5,000 and about 10,000 conductor assemblies 120 providing electrical couplings between tower assemblies 110 adjacent to one another. In some embodiments, the power transmission system 100 can include no more than about 10,000, no more than about 7,500, no more than about 5,000, no more than about 2,500, no more than about 1,500, no more than about 1,000, no more than about 500, no more than about 450, no more than about 400, no more than about 350, no more than about 300, no more than about 250, no more than about 200, no more than about 150, no more than about 100, no more than about 90, no more than about 80, no more than about 70, no more than about 60, no more than about 50, no more than about 40, no more than about 30, no more than about 20, no more than about 10, no more than about 9, no more than about 8, no more than about 7, no more than about 6, no more than about 5, no more than about 4, no more than about 3, or no more than about 2 conductor assemblies 120 providing electrical couplings between tower assemblies 110 adjacent to one another. Combinations of the above-referenced number of conductor assemblies 120 are also possible (e.g., at least about 2 and no more than about 500 or at least about 10 and no more than about 50), inclusive of all values and ranges therebetween. In some embodiments, the power transmission system 100 can include about 1, about 2, about 3, about 4, about 5, about 6, about 7, about 8, about 9, about 10, about 20, about 30, about 40, about 50, about 60, about 70, about 80, about 90, about 100, about 150, about 200, about 250, about 300, about 350, about 400, about 450, or about 500 conductor assemblies 120 providing electrical couplings between tower assemblies 110 adjacent to one another.

Each of the tower assemblies 110 may include an associated dielectric insulator (not shown). Each of the tower assemblies 110 also includes a tower or other mechanical support structure (not shown). One or more of the tower assemblies 110 include a termination via which electrical current and/or coolant can enter the transmission line and/or exit the transmission line. In some embodiments, one or more of the tower assemblies 110 can include an intermediate cooling station (ICS).

In some embodiments, the conductor assembly 120 can include a suspended conductor assembly (SCA), such that the conductor assembly 120 is suspended aboveground. In other words, the tower assembly 110A can be physically coupled to the tower assembly 110B via an SCA. In some embodiments, the electrical coupling between the power transmission system 100 and the external power grid or other external power source can include an SCA. In some embodiments, the electrical coupling between the power transmission system 100 and the one or more consumer loads can be via an SCA. In some embodiments, the SCAs described herein can include superconducting OH power transmission lines.

As shown, the power transmission system 100 includes one coolant supply system 130. In some embodiments, the power transmission system 100 can include multiple coolant supply systems 130. In some embodiments, the power transmission system 100 can include any number of coolant supply systems 130, depending upon the application and/or the distance over which the power is to be transmitted. In some embodiments, the power transmission system 100 can include at least about 1, at least about 2, at least about 3, at least about 4, at least about 5, at least about 6, at least about 7, at least about 8, at least about 9, at least about 10, at least about 20, at least about 30, at least about 40, at least about 50, at least about 60, at least about 70, at least about 80, or at least about 90, or at least about 100 coolant supply systems 130. In some embodiments, the power transmission system 100 can include no more than about 100, no more than about 90, no more than about 80, no more than about 70, no more than about 60, no more than about 50, no more than about 40, no more than about 30, no more than about 20, no more than about 10, no more than about 9, no more than about 8, no more than about 7, no more than about 6, no more than about 5, no more than about 4, no more than about 3, or no more than about 2 coolant supply systems 130. Combinations of the above-referenced number of coolant supply systems 130 are also possible (e.g., at least about 2 and no more than about 100 or at least about 10 and no more than about 50), inclusive of all values and ranges therebetween. In some embodiments, the power transmission system 100 can include about 1, about 2, about 3, about 4, about 5, about 6, about 7, about 8, about 9, about 10, about 20, about 30, about 40, about 50, about 60, about 70, about 80, about 90, or about 100 coolant supply systems 130. In some embodiments, a distance between sequential coolant supply systems 130 can be about 25 kilometers (km), or about 30 km, or about 35 km, or about 40 km, or about 45 km, or about 50 km, or about 55 km, or about 60 km, or about 65 km, or about 70 km, or about 75 km, or about 80 km, or about 85 km, or about 90 km, or about 95 km, or about 100 km, or between about 50 km and about 100 km, or between about 50 km and about 150 km.

In some embodiments, one or more of the tower assemblies 110 can be in fluid communication with one or more of the coolant supply systems 130. In some embodiments, the coolant supply system 130 can include a coolant storage unit. In some embodiments, the coolant supply system 130 can include a conditioning unit to control coolant temperature. In some embodiments, the coolant supply system 130 can be fluidically coupled to the tower assembly 110A (or any of the tower assemblies 110) via an associated coolant conduit. During operation of the power transmission system 100, coolant fluid can flow or be pumped from the coolant system 130 to the tower assemblies 110 to cool the superconducting OH power transmission line.

Figure 2:
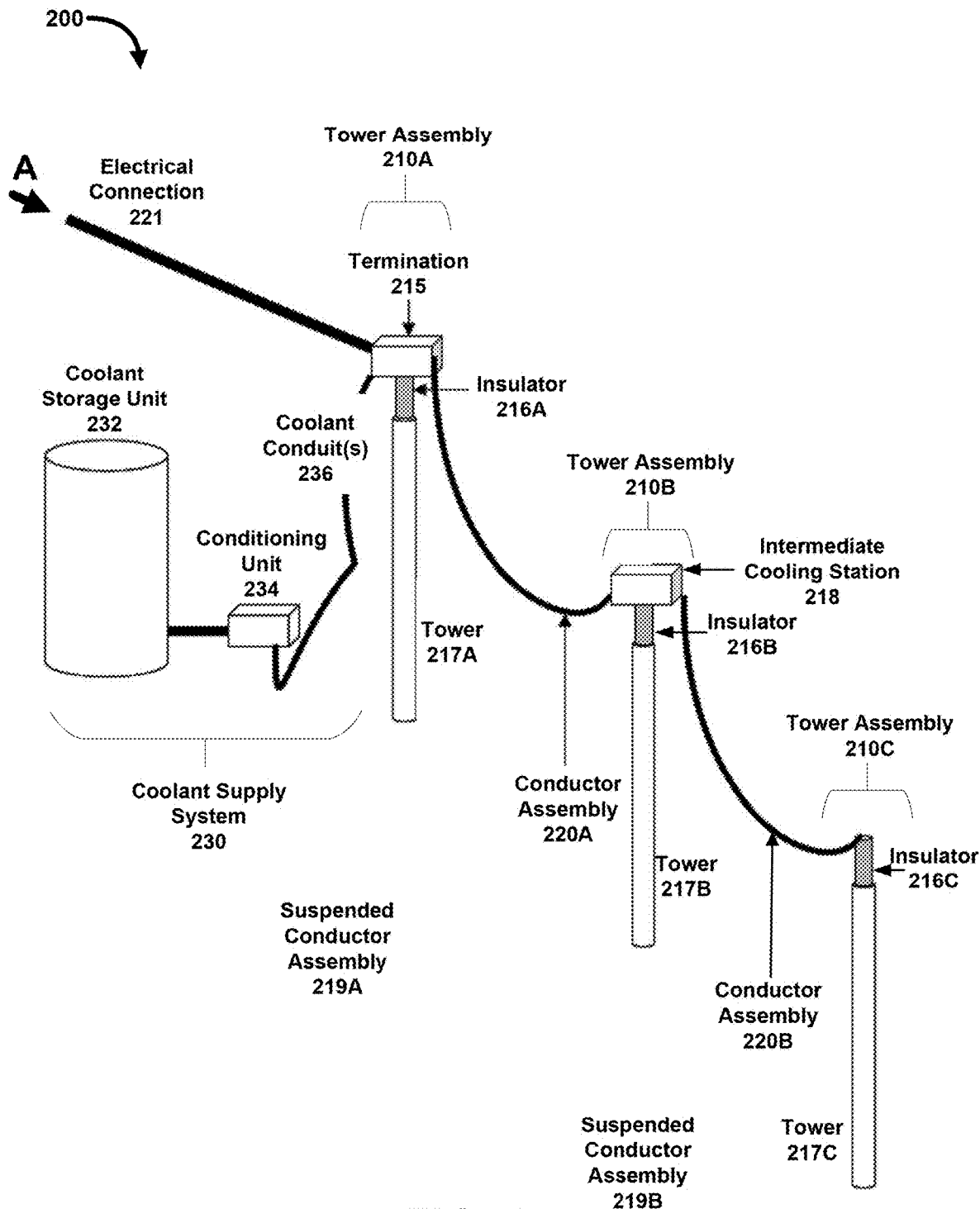
FIG. 2 illustrates a superconducting OH power transmission system, including an OH power transmission line and associated subsystems, according to an embodiment.

FIG. 2 illustrates a power transmission system 200, according to an embodiment. The power transmission system 200 includes tower assemblies 210A, 210B, 210C (collectively referred to as tower assemblies 210), conductor assemblies 220A, 220B (collectively referred to as conductor assemblies 220), and a coolant supply system 230. In some embodiments, the tower assemblies 210, the conductor assemblies 220, and the coolant supply system 230 can be the same or substantially similar to the tower assemblies 210, the conductor assembly 120, and the coolant supply system 130, as described above with reference to FIG. 1. Thus certain aspects of the tower assemblies 210, the conductor assemblies 220, and the coolant supply system 230 are not described in greater detail herein.

As shown in FIG. 2, the power transmission system 200 is an OH power transmission system and includes an OH power transmission line. In some embodiments, the power transmission system 200 can include a superconducting OH transmission system. In some embodiments, the OH power transmission line refers to a series of interconnected conductor segments (e.g., an electrical connection 221 and the conductor assemblies 220A, 220B).

The tower assemblies 210A, 210B, 210C include towers 217A, 217B, 217C (collectively referred to as towers 217) and dielectric insulators 216A, 216B, 216C (collectively referred to as dielectric insulators 216). One or more tower assemblies 210 includes a termination 215. In some embodiments, the termination 215 acts as a connection point via which electrical current can enter the conductor assemblies 220 and/or exit the conductor assemblies 220. In some embodiments, the termination 215 acts as a connection point via which coolant can enter the conductor assemblies 220 and/or exit the conductor assemblies 220.

In some embodiments, the conductor assemblies 220 can include SCAs. The conductor assemblies 220 (described in further detail below, with reference to FIG. 3) each include at least one conductive element enclosed in a TIJ. Depending on the implementation, each of the conductor assemblies 220 may include three conductors (e.g., for three phase AC electrical power transmission), two conductors (e.g., for DC bipole power transmission), or any other number of conductors, according to the design of the power transmission system. In some embodiments, the conductor assemblies 220 can collectively define a power transmission line, an OH transmission line, and/or a superconducting OH transmission line.

As shown in FIG. 2, the coolant supply system 230 includes a coolant storage unit 232 configured to store coolant fluid (including liquid, gas, or a combination of liquid and gas) and/or supply coolant fluid at a specified flow rate to a conditioning unit 234. The coolant fluid can include, for example, liquid nitrogen, liquid helium, liquid neon, liquid hydrogen, liquid natural gas, or liquid air. The conditioning unit 234 conditions the coolant fluid (e.g., by reducing the temperature and/or increasing the pressure of the coolant fluid) prior to the coolant fluid entering the transmission line, and, in turn, delivers conditioned coolant fluid (including liquid, gas, or a combination of liquid and gas) to a portion of the transmission line at a specified temperature (e.g., about 77 K) and pressure (e.g., between about 10 bar and about 15 bar, or between about 25 bar and about 30 bar), or at temperature that is within a specified temperature range and at a pressure that is within a specified pressure range. The coolant then flows into the conductor assemblies 220 through one or more coolant conduits 236 and the termination 215. Electrical power enters the power transmission system 200 from an external power grid (see arrow "A" in FIG. 2) though an electrical connection 221, and commences transmission in parallel with the coolant flow, beginning at the termination 215, through the conductor assemblies 220. The termination 215 and the conductor assemblies 220 are separated from the towers 217 by the dielectric insulators 216. During operation, the coolant fluid, electrical current and power flow along and through the conductor assemblies 220.

In some embodiments of the present disclosure, the power transmission system 200 includes one or more components that extract heat from the OH power transmission line, for example by vaporizing a portion of the flowing coolant fluid and venting the vapor from the OH power transmission line. The heat can be generated, for example, as a result of current flow and/or heat-in-leak from the ambient environment. In the embodiment of FIG. 2, the vaporization and venting processes are achieved using one or more intermediate cooling stations 218. In some embodiments, the vaporization of liquid coolant fluid occurs inside the OH power transmission line at multiple locations along the length of the OH power transmission line. For example, venting may occur at pole-mounted equipment similar to the intermediate cooling station 218.

In some embodiments, the coolant is liquid air, and during operation of the power transmission system 200, venting of associated evaporated species (i.e., nitrogen, argon, oxygen) to atmosphere or the ambient environment can be performed. In other embodiments, employing liquid helium or liquid neon as the coolant, spent coolant may be directed from the power transmission system 200 into a contained space for subsequent repurposing/re-use (e.g., after recooling to a liquid state).

In some embodiments, the coolant includes one or more (e.g., a combination of) constituents of liquid air, such as liquid nitrogen and/or liquid oxygen. For example, a composition of the coolant can include nitrogen and oxygen, with the oxygen constituting a percentage of between about and about 21% (e.g., about 1%) of the overall composition. In other words, the composition can include a combination of oxygen and nitrogen, with an amount of oxygen that falls somewhere between that of liquid air (21% oxygen) and that of pure liquid nitrogen (e.g., about 0.001% oxygen).

In some embodiments, each intermediate cooling station 218 is separated from its associated tower 217B by one or more dielectric insulators 216 (as shown in FIG. 2). The one or more dielectric insulators may be the same as the dielectric insulators 216 that separate the conductor assemblies 220 from the towers 217, or the one or more dielectric insulators may be separate dielectric insulators that support the intermediate cooling station 218 alone. In the latter case, a "jumper" coolant conduit may be used to flow nitrogen from the conductor assembly (220) to the intermediate cooling station 218. In other embodiments, the intermediate cooling station 218 may be grounded (i.e., attached to the tower 217B) without an intervening dielectric insulator. In such cases, liquid coolant may flow through the center of the dielectric insulator 216 that attaches the tower assembly 210B to the tower 217B. The dielectric insulator can facilitate transporting the liquid (which may be non-conductive) from the high voltage environment to ground potential.

In some embodiments, evaporative cooling and venting occur "at voltage" (i.e., at the same voltage as the operating voltage of the power transmission system 200) within one or more of the intermediate cooling stations 218. In other embodiments, evaporative cooling and venting occur at ground potential within one or more of the intermediate cooling stations 218. In still other embodiments, evaporative cooling occurs at voltage within one or more of the intermediate cooling stations 218, while venting occurs at ground potential within the one or more of the intermediate cooling stations 218.

In some embodiments, the coolant storage unit 232, the coolant conduit(s) 236, the conductor assemblies 220, and optionally the conditioning unit 234 and/or the termination 215, can collectively be referred to as a "coolant delivery and conditioning system" (e.g., a liquid nitrogen delivery and conditioning system). In some embodiments, the coolant delivery and conditioning system (e.g., as shown and described with reference to FIG. 2) is a valve-free coolant delivery and conditioning system. In other words, the coolant storage unit 232, the coolant conduit(s) 236, the conductor assemblies 220, and optionally the conditioning unit 234 and/or the termination 215 can operate without a valve for circulation of coolant. Alternatively or in addition, in some embodiments, the coolant delivery and conditioning system includes only one supply of coolant fluid (e.g., coolant storage unit 232 of FIG. 2), and does not include auxiliary cooling systems along the length of the OH power transmission line. Alternatively or in addition, in some embodiments, the coolant delivery and conditioning system includes multiple supplies of coolant fluid (e.g., coolant storage unit 232 of FIG. 2) positioned at towers (e.g., towers 217 of FIG. 2), but does not include auxiliary supplies of coolant fluid along the lengths of the suspended conductor assemblies of the power transmission line. Coolant supply systems that include multiple supplies of coolant fluid positioned at towers can include a supply of coolant fluid at each tower within the OH power transmission system. Coolant supply systems that include multiple supplies of coolant fluid positioned at towers can be configured to cool at least some of the supplies of coolant fluid exclusively, or substantially exclusively, using the evaporation of liquid coolant (e.g., liquid nitrogen, liquid hydrogen, liquid helium, liquid neon, liquid natural gas, or liquid air) already flowing in the OH power transmission line (e.g., delivered to the OH power transmission line via a preceding supply of coolant fluid. Alternatively or in addition, in some embodiments, the coolant supply system does not discharge coolant fluid to an exterior of the OH power transmission line at all, or does not discharge coolant fluid to an exterior of the OH power transmission line along the lengths of the suspended conductor assemblies.

Figure 3:
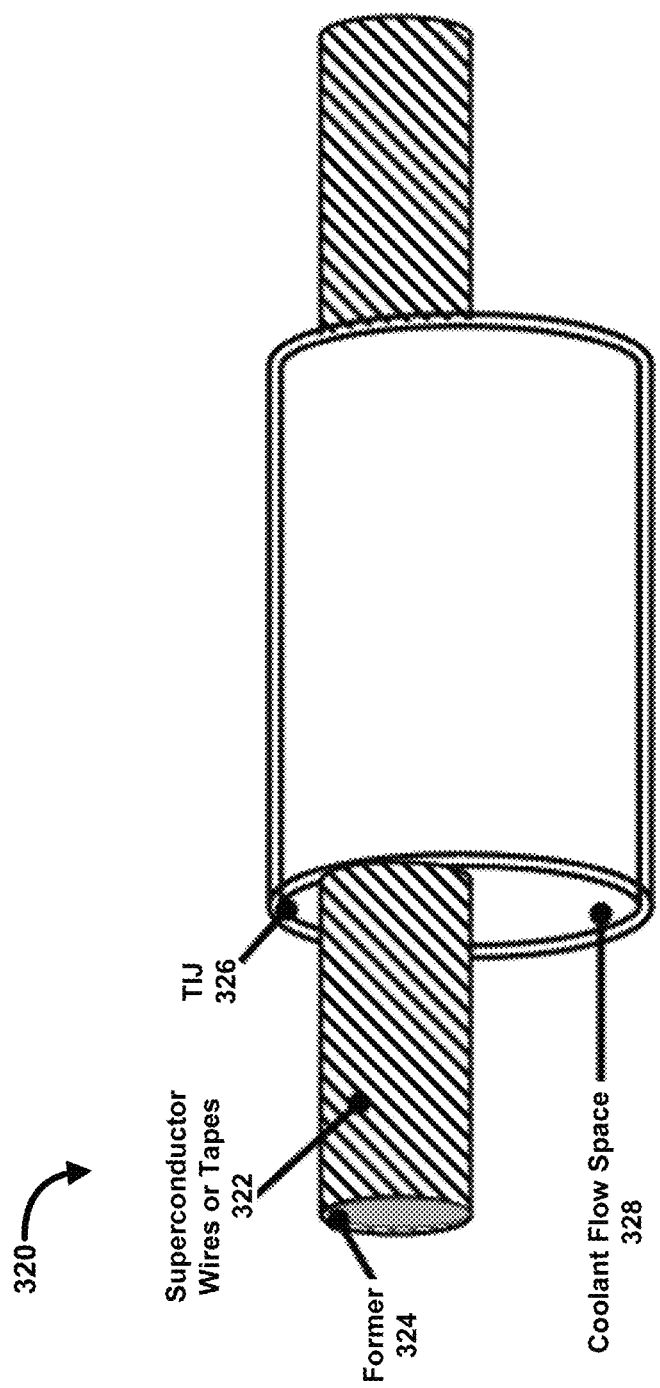
FIG. 3 shows a perspective view of a section of a conductor assembly for a superconducting OH power transmission line/system, according to an embodiment.

FIG. 3 shows a perspective view of a section of a conductor assembly 320 (e.g., for use as a conductor assembly 120 of FIG. 1) for a superconducting OH power transmission line/system, according to an embodiment. As shown in FIG. 3, the conductor assembly 320 includes a plurality of superconductor wires or tapes 322. The wires or tapes 322 can, for example, include non-spiral wound wires or tapes (i.e., wires or tapes laid along a surface such as a surface of a former, discussed further below), multiple tapes interleaved with spacers, etc. When the superconductor wires or tapes 322 are cooled below a 'critical temperature' (e.g., at or below −100° C.), the superconductor wires or tapes 322 can carry direct, or constant, electrical currents (i.e., DC current) with no resistance or with substantially no resistance, and as such, no heat is generated in the superconductor wires or tapes 322 from the DC current. Alternating, or time varying, currents (i.e., AC current) can generate a small (relative to non-superconducting materials) amount of heat in the superconductor wires or tapes 322. For example, a conductor assembly 320 may generate 0.5 W/m of heat when carrying 1,000 Arms, as contrasted with a known Aluminum conductor steel-reinforced ("ACSR") cable, which typically generates about 68 W/m of heat during operation.

The superconductor wires or tapes 322 may be wound on a former 324, for example in a spiral fashion (as shown in FIG. 3), in multiple layers with multiple superconductor wires per layer. Alternatively, the superconducting wires/tapes may be placed in a non-spiral manner on the former 324. Parameters such as the number of wires/tapes per layer, the width or diameter of the superconductor wire/tape, the angle and direction of winding, and the number of layers can be selected or adjusted based on a desired application, for example to minimize AC losses and/or to minimize self-inductance of the conductor assembly 320. Similarly, a number of layers with desired winding angles may be selected to produce desired mechanical and/or electrical characteristics of the conductor assembly 320. The superconductor wires or tapes 322 and the former 324 can collectively be referred to as a conductor core.

In some embodiments, the former 324 is hollow such that it can carry gas, vapor and/or liquid coolant fluid to assist with cooling of the conductor assembly 320. Alternatively or in addition, the former 324 may be porous to allow the ingress or egress of liquid, vapor or gas coolant.

In some embodiments, the former 324 may carry or bear some or all of the tensile force during suspension of the conductor assembly 320 (e.g., as part of a suspended conductor assembly).

A TIJ 326 encloses the superconductor wires or tapes 322 and defines a coolant flow space 328 configured to minimize an amount of heat from the surroundings that reaches the superconductor wires or tapes 322. During operation, an inner surface of the TIJ 326 can be cooled to a temperature of the coolant, while an outer surface of the TIJ 326 can be at ambient temperature, and the inner surface of the TIJ 326 can be load bearing (i.e., providing mechanical support). Alternatively or in addition, a separate cable or tube positioned within the TIJ 326 can be load bearing and provide mechanical support.

The TIJ 326, itself, can include, for example, two concentric metal pipes spaced from one another, with vacuum or another material (e.g., carbon dioxide (CO2), an inert gas, etc.) disposed between the two metal pipes. As another example, the TIJ 326 may include two concentric metal pipes, rendered flexible by corrugation or other means, spaced from one another, with vacuum or another material (e.g., an inert gas) disposed between the two flexible metal pipes. As yet another example, the TIJ 326, itself, can include, for example, two concentric metal pipes spaced from one another, with vacuum or another material (e.g., carbon dioxide (CO2), an inert gas, etc.) disposed between the two metal pipes, and with a spacing and/or material of the concentric metal pipes rendering the TIJ 326 semi-rigid. The phrase "semi-rigid," as used herein, can refer to the property of being able to bend slightly (e.g., to a radius of curvature of no less than 10 meters) under a mechanical load. In some embodiments, the TIJ can include another type of thermal insulation, such as expanded foam. The TIJ 326 can be manufactured in segments having lengths that are appropriate for shipping, transport and installation.

In some embodiments, an interior surface of the TIJ 326 is configured to (or has mechanical/materials properties such that it will) thermally contract upon being cooled to an operating temperature. This contraction can be significant, for example if the operating temperature is below −100° C. An exterior wall of the TIJ 326 can be configured to (or have mechanical/materials properties such that it will) accommodate the reduction in length of the interior surface of the TIJ 326, along with the other elements of the conductor assembly 320. In some implementations, one or more elements providing the tensile strength of the conductor assembly 320 are selected such that they exhibit a contraction that is similar to, or that matches, the thermal contraction of the inner wall of the TIJ 326. In such implementations, the conductor assembly 320 can be installed between poles or towers supporting the OH power transmission line at ambient temperatures with a specified pre-calculated tension. This tension results in an acceptable sag of the conductor assembly 320 between the poles/towers, and an acceptable closest approach to ground level. During operation, and upon being cooled to the operating temperature, the conductor assembly 320 (under tension) contracts, the mechanical tension of the conductor assembly 320 increases, and the sag decreases. The tension at operating temperature is thereafter maintained within acceptable limits for use in power transmission lines.

In some embodiments, the coolant flow space 328 is filled with a flowing liquid coolant. If the superconductor wires or tapes 322 include one or more cryogenically cooled superconductors, the liquid coolant can be a liquid cryogen (e.g., liquid nitrogen, liquid hydrogen, liquid helium, liquid neon, liquid natural gas, or liquid air). In cryogenic embodiments, the heat energy entering the conductor assembly 320 from the surroundings should be minimized, to minimize the cooling requirements. This can be accomplished by, for example, using a double-walled vacuum insulated pipeline as the TIJ 326.

In some embodiments, when used in the context of a superconducting OH power transmission (or and/or distribution) system, the conductor core (i.e., the superconductor wires or tapes 322 and the former 324), the coolant and the TIJ 326 are maintained at the system operating voltage.

In some embodiments, the TIJ 326 is not dielectrically insulated using a solid insulation material. Instead, air can be used as insulation, similar to the manner in which air can be used to dielectrically insulate known transmission conductors, if the system is designed such that the thermally insulating member(s) operate at the same voltage as the conductor(s). Previous attempts to develop superconducting cables with a "warm dielectric," in which the thermal insulating members are operated at line voltage, pertained to underground applications and required external solid insulation. Such solid insulators are not included in embodiments of the present disclosure.

As discussed above, in some embodiments, suspended conductor assemblies are attached to the towers using one or more dielectric insulators. In some such embodiments, the dielectric insulators are configured to transport liquid nitrogen and/or vapor nitrogen from one or more high voltage regions of the superconducting OH power transmission system to ground potential. Heat that enters the TIJ 326 or that is generated by electrical energy losses and/or magnetic energy losses inside the TIJ 326 should be removed from the superconducting OH power transmission system to ensure that an appropriate operating temperature is maintained. Intermediate cooling stations disposed on one or more towers of the superconducting OH power transmission system can be used to accomplish this. If the intermediate cooling station(s) produce excess vapor by utilizing boiling coolant, this excess can be vented to atmosphere.

In some embodiments, multiple conductor assemblies as shown in FIG. 3 are supported by poles or towers to maintain an adequate clearance between the conductor assemblies and the ground. The spacing between the poles or towers and the tensile strength of the conductor assemblies can be selected such that a desired suspension can be maintained throughout operation. Tensile forces on the conductor assemblies can be carried/borne by one or more components of the superconducting OH power transmission system, such as the former 324, the inner wall of the TIJ 326, and/or an additional force carrying member (such as steel rope or wire), that are disposed within a cooled region of the superconducting OH power transmission system.

Each conductor assembly 320 can be installed in an un-cooled (i.e., ambient temperature) state between a pair of poles, and will exhibit a first curvature (e.g., a catenary) when suspended. The first curvature can be described as a first sag, which depends on the tension forces exerted at the poles. When coolant begins to flow within the conductor assemblies 320, the internal temperature of the conductor assemblies 320 decreases and, due to thermal contraction, the element(s) of the conductor assemblies 320 that bear the tensile forces contract or become shorter. This contraction causes a reduction in the sag, resulting in a second curvature different from (and shallower than) the first curvature, and the tension forces increase. The decrease in length of the element(s) can be, for example, about 0.5%, for example for conductor assemblies that are cooled using liquid nitrogen. As discussed above, in some embodiments, all components disposed within the cooled region of the superconducting OH power transmission system are configured to (or have mechanical or material properties such that they) contract in length similarly. In other words, the difference in thermal contraction between installation ambient temperature and operating temperature is less than that which would result in a permanent deformation of one or more of the components. For example, if one of the components is placed under tensile stress by a differential contraction, the stress may be less than a quarter of the yield stress (assuming an engineering safety factor of 4 is appropriate for the application). In direct contrast with known systems, superconducting OH power transmission lines of the present disclosure exhibit the same sag (or substantially the same lag), and hence the same clearance to ground (or substantially the same clearance to ground), under all electrical loads and environmental temperatures.

In some embodiments, all components disposed within the cooled region of the superconducting OH power transmission system are fabricated from the same type of material.

The capacitance of a power transmission line is one of the parameters that determines the operating characteristics of the power transmission line in an AC grid, and that influences the surge impedance loading (i.e., the ratio of the amplitudes of voltage and current of a single wave propagating along the power transmission line). The capacitance of a power transmission line can be determined by integrating the electric field from the outer envelope of the power transmission line to an upper limit distance determined by the placement of other phases of the circuit and/or the ground. The electric field near a conductor varies as l/r (r being the distance from the center of a conductor), and consequently, the radius of the 'at voltage' envelope significantly determines the capacitance. The assembly of FIG. 3, with the outer wall of the TIJ 326 maintained at the system operating voltage, has a capacitance that is lower than that of known power transmission lines, which offers operational advantages.

Figure 4:
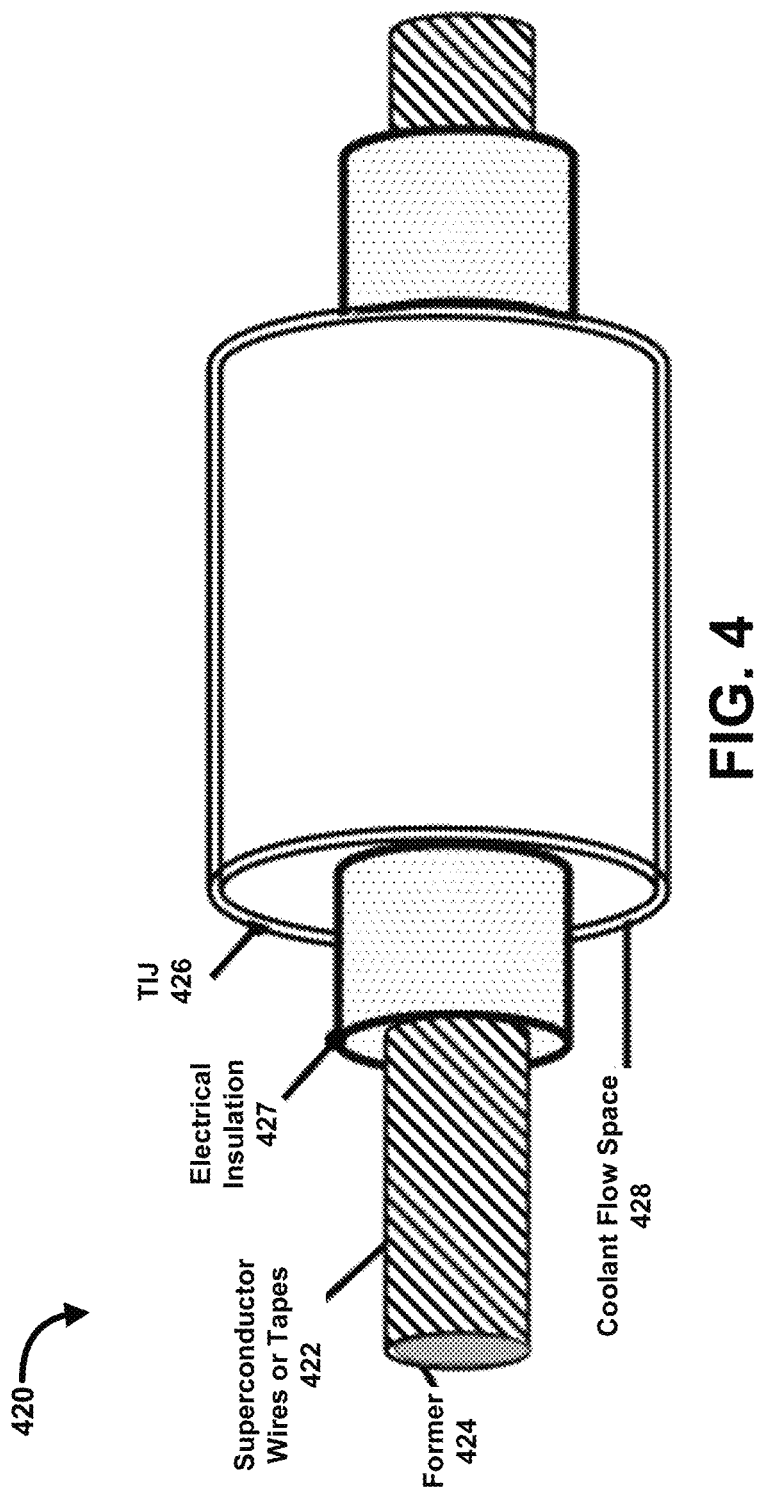
FIG. 4 shows a perspective view of a section of a conductor assembly for a superconducting OH power transmission line/system, including electrical insulation adjacent to one or more superconductors (superconductor wires or tapes) and disposed within a TIJ, according to an embodiment.

FIG. 4 shows a perspective view of a section of a conductor assembly 420 for a superconducting OH power transmission line/system, including electrical insulation 427 (e.g., cross-linked polyethylene ("XLPE") or polypropylene laminated paper ("PPLP") adjacent to one or more superconductors (superconductor wires or tapes 422) and disposed within a TIJ 426, according to an embodiment. The TIJ 426 defines a coolant flow space 428 configured to minimize an amount of heat from the surroundings that reaches the superconductor wires or tapes 422. As shown in FIG. 4, the electrical insulation 427 is disposed fully within the TIJ 426 such that the electrical insulation 427 is cooled to the superconductor operating temperature during operation of the superconducting OH power transmission line/system. The embodiment of FIG. 4 can be referred to as a "cold dielectric design." The thickness of the electrical insulation 427 can be selected to ensure that all other components within the TIJ 426 are maintained at ground potential without the risk of short-circuiting. In the embodiment of FIG. 4, there is no electric field away from the conductor (i.e., the magnitude of the electric field vector, irrespective of the direction of the field vector, is zero). Superconducting OH power transmission lines using one or more conductor assemblies of FIG. 4 can be referred to as "minimal fire hazard" power lines, in that any objects coming into contact with the power line (e.g., tree branches, vegetation) will not form a short circuit to ground, and will not ignite fuel. In other embodiments, the thickness of the electrical insulation 427 may be selected at a level that achieves less than full electrical insulation (i.e., partial electrical insulation), in which case the electrical insulation 427 presents a high resistivity barrier to an electrical short circuit reducing the fault current flowing. Superconducting OH power transmission lines using one or more such conductor assemblies can be referred to as "reduced fire hazard" power lines.

Figure 5:
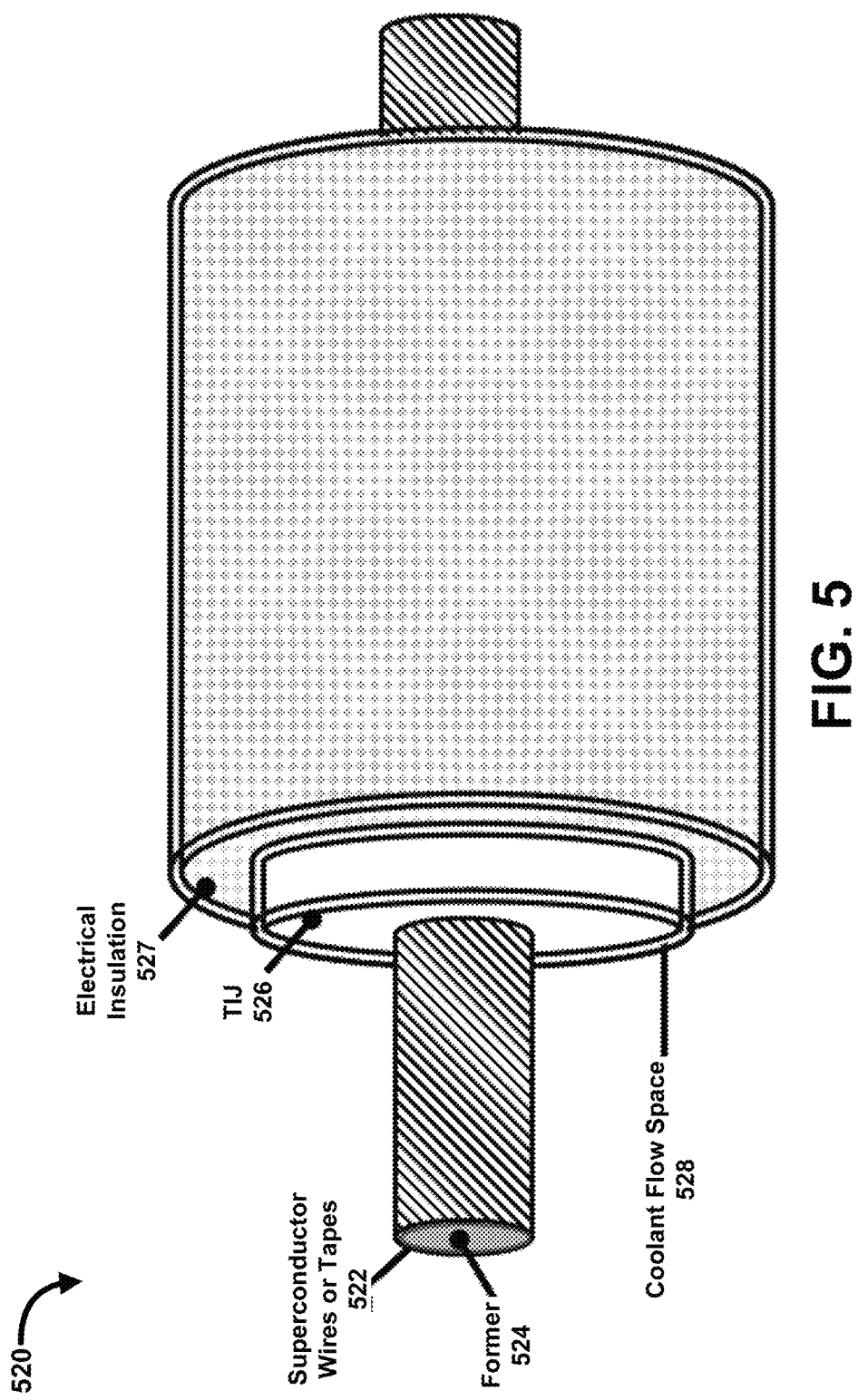
FIG. 5 shows a perspective view of a section of a conductor assembly for a superconducting OH power transmission line/system, including electrical insulation disposed exterior to a TIJ, according to an embodiment.

FIG. 5 shows a perspective view of a section of a conductor assembly 520 for a superconducting OH power transmission line/system, including electrical insulation 527 disposed exterior to a TIJ 526, according to an embodiment. The TIJ 526 defines a coolant flow space 528 configured to minimize an amount of heat from the surroundings that reaches the superconductor wires or tapes 522. Because the electrical insulation 527 is outside the TIJ 526, the electrical insulation 527 is not cooled to the superconductor operating temperature during operation of the superconducting OH power transmission line/system. As such, the embodiment of FIG. 5 can be referred to as a "warm dielectric" design. The thickness of the electrical insulation 527 can be selected such that the conductor assembly 520 can come into contact with a ground potential without risk of a short circuit. Similar to conductor assembly 420 of FIG. 4, there is no electric field away from the conductor assembly 520 of FIG. 5. Superconducting OH power transmission lines using one or more conductor assemblies of FIG. 5 can be referred to as "minimal fire hazard" power lines, in that any objects coming into contact with the power line (e.g., tree branches, vegetation) will not form a short circuit to ground, and will not ignite fuel.

In some embodiments, an electrically conducting layer (not shown) is applied to at least a portion of (e.g., an entire exterior surface of) the electrical insulation 527 in the embodiment of FIG. 5. The electrically conducting layer can include, for example, a superconducting winding or a non-superconducting winding. The electrically conducting layer can be electrically grounded, or can be electrically connected to a nonzero potential such that the conducting layer carries a current that is equal to (or substantially equal to), but of opposite polarity (e.g., instantaneous AC or AC) as compared with, the current in the conductor core (which includes the superconductor wires or tapes 522 and the former 524). When the electrically conducting layer is electrically grounded or connected to a nonzero potential as discussed above, the operation of the conductor assembly 520 does not result in any electric field or magnetic field outside the TIJ 526. Superconducting OH power transmission lines using one or more such conductor assemblies of FIG. 5 can be referred to as "zero external electromagnetic field ("EMF")" power lines.

In some embodiments, an outer electrically conducting layer (referred to herein as a "shield layer") is applied to at least a portion of (e.g., an entire exterior surface of) the electrical insulation 527 in the embodiment of FIG. 5. The outer electrically conducting layer can include, for example, a superconducting winding or a non-superconducting winding. During operation of a power line including the conductor assembly 520, the current flowing in the shield layer can be controlled, to control the self-inductance of the AC power line. For example, if the shield layer carries a current that is equal in magnitude and opposite in polarity to the current of the conductor core, there is no magnetic field outside the power line and the self-inductance of the power line is minimized. Conversely, reducing the shield current using an external means can cause the self-inductance of the power line to increase. As such, the power flow in the grid and/or power line can advantageously be controlled. The shield layer may be placed along the entire length of, or a portion of the length of, the power line.

In some embodiments, an outer conducting layer (referred to herein as a "shield layer") is applied to at least a portion of (e.g., an entire exterior surface of) the electrical insulation 527 in the embodiment of FIG. 5. The outer conducting layer can include, for example, a superconducting winding or a non-superconducting winding. In addition, a material having a magnetic permeability greater than unity is placed outside the shield layer. During operation of a power line including the conductor assembly 520, if the shield layer carries a current that is equal in magnitude and opposite in polarity to the current of the conductor core, no magnetic field will impinge on the magnetic layer, and the self-inductance of the power line is minimized. Conversely, reducing the shield current using an external means allows the magnetic field to interact with the magnetic material, thereby significantly increasing the self-inductance of the power line. As such, the power flow in the grid and/or power line can advantageously be controlled. The shield layer and/or the magnetic material may be placed along the entire length of, or a portion of the length of, the power line.

Although shown and described in FIG. 5 as including a single conductor core within the TIJ 526, the conductor assembly 520 can alternatively include multiple (e.g., two, three, four, five, or between five and ten) conductor cores within the same TIJ 526. For example, two conductor cores may be included within a TIJ 526 of the conductor assembly 520, for example as the two poles of a DC bipole system. As another example, three conductor cores may be included within a TIJ 526 of the conductor assembly 520, for example as the three phases of a 3-phase AC power transmission system.

FIG. 6 shows a perspective view of a short section of a conductor assembly 620 for use in a superconducting OH power transmission line/system (e.g., similar to the superconducting OH power transmission system of FIG. 1) using a "distributed cooling" approach. The conductor assembly includes a coolant tube 629 for carrying liquid coolant (e.g., liquid nitrogen, liquid helium, liquid neon, liquid hydrogen, liquid natural gas, or liquid air) at a pressure greater than a pressure of the coolant flow space 628 defined by the TIJ 626. Coolant tube 629 can be manufactured to include a plurality of pores or orifices, for example occurring at specified intervals along the length of the coolant tube 629. During operation of the conductor assembly 620, liquid coolant can exit the coolant tube 629 through the pores or orifice, and enter into the coolant flow space 628, such that the coolant flow space 628 contains coolant vapor and liquid—a two-phase (biphasic) fluid. Heat leaking into the coolant flow space 628 or generated within the TIJ 326 will cause the temperature of the two-phase fluid to increase until it reaches the boiling point of the liquid coolant at the local pressure in the coolant flow space 628. Consequently, the coolant liquid in the coolant flow space 628 will boil and maintain the cooled region at the local pressure-dependent boiling temperature (or "saturation temperature") of the coolant if enough coolant is present. As an example, when the coolant is liquid nitrogen and the coolant flow space 628 is at atmospheric pressure, the saturation temperature is approximately −196° C. (77K).

In an alternative implementation of the conductor assembly 620 of FIG. 6, liquid coolant may flow in the coolant flow space 628 and enter the coolant tube 629 via the plurality of pores or orifices (e.g., at the specified intervals). During operation of the conductor assembly 620, heat is transferred to the coolant tube 629 from the liquid coolant in the coolant flow space 628, via conduction and/or convection, thereby causing the liquid coolant in the coolant tube 629 to boil, in which case the coolant tube 629 will carry coolant vapor at the saturation temperature.

Although shown and described with reference to FIG. 6 as being disposed within the coolant flow space 628, in other embodiments, the coolant tube 629 may be disposed within the former 624 of the conductor core. In still other embodiments, the coolant tube 629 may be omitted, and the former 624 may serve as a coolant tube. The coolant tube 629 may be configured to support, or bear, all or a portion of the tensile forces of suspension of the conductor.

In some embodiments, during operation of a conductor assembly including a coolant tube (such as the coolant tube 629 of FIG. 6), vapor is generated along the entire length of the conductor assembly. In such embodiments, separate tower-mounted intermediate cooling stations may not be used within the associated power transmission system. In such embodiments, tower-mounted equipment may still be positioned at locations along the power transmission line, but the role of such tower-mounted equipment may be primarily to remove vapor from the conductor assembly and prepare it for venting, and not to generate vapor.

In some embodiments, a power transmission line includes a distributed cooling system that does not incorporate a coolant supply at either terminal end of the power transmission line. Rather, all coolant fluid (e.g., liquid nitrogen, liquid helium, liquid neon, liquid hydrogen, liquid natural gas, or liquid air) is introduced to, and consumed by (e.g., via evaporation and/or venting), the power transmission line along its multiple constituent suspended conductor assemblies (all LN2 is utilized/evaporated along the line length for cooling) via one or more coolant supplies (e.g., intermediate cooling stations). Optionally, one or more of the intermediate cooling stations is configured to facilitate the flow of coolant in both directions within the power transmission line. For example, if an individual coolant supply is configured to supply coolant over a distance of 25 km, a first instance of that individual coolant supply may be positioned at a location along the power transmission line that is 25 km from a first terminal end of the power transmission line, such that it supplies coolant over a distance of 25 km back toward the first terminal end of the power transmission line (i.e., in a first direction) and forward over a distance of 25 km along the power transmission line (i.e., in a second direction opposite the first direction). If the power transmission line is sufficiently long, a second instance of the individual coolant supply may be positioned at a location along the power transmission line that is 75 km from the first terminal end of the power transmission line. (thereby supplying coolant for the section of the power transmission line between 50 km and 100 km from the first terminal end of the power transmission line).

In some embodiments, a power transmission line includes a distributed cooling system that incorporates a coolant supply at one terminal end of the power transmission line, but not at the other terminal end of the power transmission line, to introduce coolant fluid to the power transmission line. In addition, coolant fluid (e.g., liquid nitrogen, liquid helium, liquid neon, liquid hydrogen, liquid natural gas, or liquid air) is introduced to, and consumed by (e.g., via evaporation and/or venting), the power transmission line along its multiple constituent suspended conductor assemblies (all LN2 is utilized/evaporated along the line length for cooling).

In some embodiments, a distributed cooling system (e.g., including the conductor assembly 620 of FIG. 6, having a coolant tube and generating vapor inside the conductor assembly) is controlled such that there is no remaining nitrogen flow at the end of each section, and thus no coolant accumulates at the end of the power transmission line.

In some embodiments, a periodic cooling system (i.e., a cooling system that generates vapor at heat exchangers located inside the tower assemblies) has a non-zero coolant flow at the ends of the cooling stations. To manage such coolant flow, the coolant may be transported in only one direction from a first coolant supply location, and the end of one section of the power transmission line may be located at a second coolant supply location for a next section of the power transmission line. In such a configuration, excess coolant from the first section of the power transmission line flows into one or multiple coolant storage tanks at the second coolant supply location and can eventually be reconditioned and used for cooling the next section of the power transmission line. Excess liquid nitrogen at the remote terminal end of the power transmission line may be repurposed, stored, transported away from the terminal end of the power transmission line (e.g., by truck to one of the coolant supply locations), and/or evaporated to the air at that location.

In other embodiments, a periodic cooling system is configured to facilitate coolant flow, from each coolant supply location, in both directions along the power transmission line, in one pole (for DC applications) or 2 phases (in AC applications), and the subsequent return of the coolant back to the coolant supply location in the other pole (DC) or the third phase (AC), thereby eliminating the need to capture and manage excess coolant flows at the end(s) of the power transmission line.

In some embodiments, a power transmission system includes one or more thermal insulation jackets, to maintain the superconductor at a low temperature, and one or more dielectric insulators. In other embodiments, a power transmission system includes one or more thermal insulation jackets, to maintain the superconductor at a low temperature, but does not include dielectric insulators. In such embodiments, air may provide dielectric insulation.

In some embodiments, a power transmission system includes multiple support towers, each extending from a surface of the earth along a direction normal to the surface of the earth, and multiple conductor assemblies. Each conductor assembly is disposed between and mechanically supported, in a suspended configuration, by a pair of the support towers, and each conductor assembly includes an electrical conductor including a superconductor material. Each conductor assembly is configured to receive a coolant flow to maintain the superconductor material within a temperature range below an ambient temperature. Each conductor assembly can include a thermal insulation jacket configured to contain the coolant flow, the thermal insulation jacket not being electrically isolated from an operating voltage of the power transmission system.

In some embodiments, each conductor assembly further includes a thermal insulation jacket having an inner/interior surface that is maintained at a temperature similar to a temperature of the electrical conductor (while an outer/exterior surface of the thermal insulation jacket is maintained at ambient temperature), the thermal insulation jacket being configured to mechanically support the associated conductor assembly. In addition, the thermal insulation jacket may be maintained at a voltage that is equal to a voltage of the electrical conductor. The thermal insulation jacket can include one or more of vacuum, an inert gas, or an insulating foam.

In some embodiments, the power transmission system also includes a plurality of mechanical supports, each mechanical support from the plurality of mechanical supports configured to mechanically support a conductor assembly from the plurality of conductor assemblies.

In some embodiments, each conductor assembly from the plurality of conductor assemblies further includes a thermal insulation jacket and a dielectric insulator disposed between the electrical conductor and the thermal insulation jacket, the dielectric insulator including a solid dielectric material (e.g., XLPE or PPLP).

In some embodiments, each conductor assembly from the plurality of conductor assemblies further includes a thermal insulation jacket having a dielectric insulator disposed between two concentric walls, the dielectric insulator including a solid dielectric material (e.g., XLPE or PPLP).

In some embodiments, each conductor assembly from the plurality of conductor assemblies further includes a thermal insulation jacket and a dielectric insulator, the dielectric insulator disposed between an outer surface of the thermal insulation jacket and an outer surface of the conductor assembly. In other embodiments, each conductor assembly from the plurality of conductor assemblies further includes a thermal insulation jacket and a dielectric insulator, the dielectric insulator being an outermost component of the conductor assembly such that an outer surface of the dielectric insulator is the outer surface of the conductor assembly.

In some embodiments, a power transmission system includes multiple support tower assemblies, multiple conductor assemblies suspended above a surface of earth, and a cryogenic supply system (e.g., a liquid nitrogen supply system). Each of the support tower assemblies includes a support tower and a termination. Each of the conductor assemblies is disposed between and mechanically supported by a pair of the support towers. The cryogenic supply system is configured to deliver a cryogen (e.g., including at least one of liquid nitrogen, liquid hydrogen, liquid helium, liquid neon, liquid natural gas, or liquid air), during operation of the power transmission system, to at least one of the terminations for cooling of the conductor assemblies. Each of the conductor assemblies includes a superconducting current carrying element (e.g., superconductor-containing wires or superconductor-containing tapes) and a thermal insulation jacket configured to receive a flowing coolant that maintains a temperature of the superconductor material within a temperature range that is below an ambient temperature. The thermal insulation jacket can be configured to contain the coolant within the conductor assembly, and direct or manage the flow of the coolant. The thermal insulation jacket can also reduce or limit the amount of ambient heat that reaches the coolant. The coolant can include one or more cryogens. The coolant can protect the superconducting current carrying elements from heat during operation of the power transmission system, for example by absorbing heat entering the power transmission system from the environment and/or by absorbing heat generated within the conductor assemblies. Heat generated within the conductor assemblies can be due, for example, to power flow, coolant flow, energy losses within insulating materials (e.g., dielectric losses) due to varying voltages, energy losses in conductive materials due to varying magnetic fields (e.g., eddy current losses), and/or energy losses in magnetic materials due to varying magnetic fields (e.g., magnetic hysteresis losses).

In some embodiments, at least one of the thermal insulation jackets is not electrically isolated from an operating voltage of the power transmission system. In other embodiments, at least one of the thermal insulation jackets is electrically grounded and a dielectric insulator is disposed between the electrical conductor and the thermal insulation jacket.

In some embodiments, at least one of the support tower assemblies includes an intermediate cooling station configured to vent vapor produced by the cryogen during operation of the power transmission system.

In some embodiments, the cryogenic supply system includes a conditioning unit to supply the cryogen to the terminations, and to measure or adjust a temperature of the cryogen as it flows therethrough.

In some embodiments, at least one of the thermal insulation jackets includes a tensile support element configured to mechanically support the associated suspended conductor assembly.

In some embodiments, each of the conductor assemblies is connected to an associated support tower assembly from the plurality of support tower assemblies via an insulator, the insulator providing electrical isolation of the conductor assembly from the associated support tower assembly.

In some embodiments, the conductor assemblies form a transmission line, and the cryogen flows along a direction parallel to the transmission line during operation of the power transmission system.

In some embodiments, a power transmission system includes multiple support tower assemblies, multiple conductor assemblies suspended above a surface of earth, and a coolant supply system. Each of the support tower assemblies includes a support tower and a termination. Each of the conductor assemblies is disposed between and mechanically supported by a pair of the support towers. The coolant supply system is configured to deliver coolant (e.g., liquid nitrogen, liquid hydrogen, liquid helium, liquid neon, liquid natural gas, or liquid air), during operation of the power transmission system, to at least one of the terminations for cooling of the conductor assemblies. Each of the conductor assemblies includes a superconducting current carrying element (e.g., superconductor-containing wires or superconductor-containing tapes) and a thermal insulation jacket to contain the coolant during operation of the power transmission system. The coolant maintains the superconducting current carrying elements within a temperature range below an ambient temperature.

Depending on the embodiment, terminations of the present disclosure can be of one of three different types: a terminal end termination (i.e., disposed at a terminal end of a power transmission line), a re-cooling termination, or a "pass-through" termination (i.e., permitting power and coolant to flow therethrough, but not supplying coolant and not terminating the power transmission line).

In some embodiments, the power transmission system also includes one or more re-cooling stations configured to modify a temperature (and, optionally, a pressure) of the coolant. Each such re-cooling station can be maintained at an operating voltage of the power transmission system and isolated from a ground potential. Alternatively, each such re-cooling station can be maintained at a ground potential.

In some embodiments, at least one of the support tower assemblies includes an intermediate cooling station to vent vapor produced by a liquid cryogen (e.g., at least one of liquid nitrogen, liquid hydrogen, liquid helium, liquid neon, liquid natural gas, or liquid air) during operation of the power transmission system.

In some embodiments, each thermal insulation jacket includes a thermal insulator disposed between two concentric walls, the thermal insulator including at least one of vacuum, an inert gas, or an insulating foam.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including,"

"carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
   transferring electricity through a conductor assembly at an operating voltage, the conductor assembly including an electrical conductor including a superconductor material, the conductor assembly supported via a plurality of support towers, the plurality of support towers including first tower serving as a termination tower and a second tower including an insulator;
   causing electrical current to enter the plurality of support towers via the first tower;
   causing a coolant to flow from a coolant supply system to the first tower via a coolant conduit, the coolant maintaining the superconductor material within a temperature range below an ambient temperature;
   causing the coolant to flow from the first tower to the second tower via the conductor assembly, such that the conductor assembly directly contacts the insulator of the second tower; and
   venting vapor produced by the coolant to an ambient environment.

2. The method of claim 1, wherein the coolant includes at least one of liquid nitrogen, liquid hydrogen, liquid helium, liquid neon, liquid natural gas, or liquid air.

3. The method of claim 1, wherein at least a portion of the venting occurs at an intermediate cooling station disposed between a first portion of the conductor assembly and a second portion of the conductor assembly.

4. The method of claim 1, wherein the coolant maintains the superconductor material within the temperature range via evaporative cooling.

5. The method of claim 4, wherein the evaporative cooling occurs in an intermediate cooling station disposed between a first portion of the conductor assembly and a second portion of the conductor assembly.

6. The method of claim 4, wherein the evaporative cooling and the venting occur at ground potential.

7. The method of claim 4, wherein the evaporative cooling and the venting occur at the operating voltage.

8. The method of claim 1, further comprising:
   suspending the conductor assembly above a surface of earth.

9. The method of claim 1, wherein causing the coolant to flow from the coolant supply system to the conductor assembly is via pumping.

10. A method, comprising:
    transferring electricity through a conductor assembly, the conductor assembly including an electrical conductor including a superconductor material, the conductor assembly including a plurality of support towers;
    causing a coolant to flow through a coolant flow space within the conductor assembly, the coolant maintaining the superconductor material within a temperature range below an ambient temperature; and
    exposing at least a portion of the coolant to an ambient environment at a location elevated via a support tower from the plurality of support towers to separate a vapor phase of the coolant from a liquid phase of the coolant.

11. The method of claim 10, wherein the coolant directly contacts the superconductor material while flowing through the coolant flow space.

12. The method of claim 10, further comprising:
    causing the coolant to flow from a coolant tube to the coolant flow space.

13. The method of claim 12, further comprising:
    causing the coolant to flow from a coolant supply system to the coolant tube.

14. The method of claim 13, further comprising:
    at least one of reducing a temperature of the coolant or increasing a pressure of the coolant before causing the coolant to flow from the coolant supply system to the coolant tube.

15. The method of claim 12, wherein maintaining the superconductor material within the temperature range is via evaporative cooling.

16. The method of claim 15, wherein the evaporative cooling occurs in an intermediate cooling station disposed between a first portion of the conductor assembly and a second portion of the conductor assembly.

17. A method, comprising:
    transferring electricity through a conductor assembly at an operating voltage, the conductor assembly including an electrical conductor including a superconductor material;
    pumping a cooling fluid through the conductor assembly to maintain the superconductor material within a temperature range below an ambient temperature; and
    causing at least a portion of the cooling fluid to be vented to an ambient environment at an elevated location above a surface of earth.

18. The method of claim 17, wherein pumping the cooling fluid includes pumping the cooling fluid from a coolant system to a tower assembly, the tower assembly providing physical support to the conductor assembly.

19. The method of claim 17, wherein the cooling fluid includes at least one of liquid nitrogen, liquid hydrogen, liquid helium, liquid neon, liquid natural gas, or liquid air.

20. The method of claim 17, wherein the venting occurs at an intermediate cooling station disposed between a first portion of the conductor assembly and a second portion of the conductor assembly.

21. The method of claim 17, wherein the cooling fluid maintains the superconductor material within the temperature range via evaporative cooling.

* * * * *